Reissued Sept. 30, 1941

Re. 21,916

UNITED STATES PATENT OFFICE 21,916

TREATING OIL WELLS

William V. Vietti, Cucuta, Colombia, and Allen D. Garrison, Houston, Tex., assignors to The Texas Company, New York, N. Y., a corporation of Delaware No Drawing. Original No. 2,024,119, dated December 10, 1935, Serial No. 739,504, August 11, 1934. Application for reissue August 13, 1941, Serial No. 406,730

17 Claims. (Cl. 166—21)

This invention relates to the treatment of an oil well, and more particularly to the chemical treatment of the sand adjacent a producing well in order to render the sand more permeable to oil and less permeable to water.

It is recognized that ordinary sand is more easily wet by water than by oil and, given an equal head, water will displace oil in its flow through a sand to a well bore. This frequently results in the sand, or certain layers thereof, about a well bore becoming wet with water, whereby the well produces a substantial proportion of water. It is thought that the most permeable sands are most likely to become wet by water, and they continue to produce large amounts of water once an oil well starts "making water."

It is an object of the present invention to treat a producing well which is making water, so as to materially reduce the proportion of water produced, without substantially interferring with the flow of oil to the well, and to accomplish this in a simple and expeditious manner.

It has heretofore been proposed to shut off the water in an oil well by the use of cement by one of the following methods:

(1) Plugging off the bottom of the hole by a cement plug, (2) Bridging a hole and forcing cement back into the watered sand, later drilling out the cement and bridge; and (3) Running a string of casing or a liner and cementing off upper water. A Portland cement is generally used in this work.

In accordance with the present invention, a well is treated by depositing a chemical precipitate in the water wet sand adjacent the well so as to render the sand less permeable to water and without substantially retarding the flow of oil to the well. It is found that certain types of precipitates act as preferential wetting agents to render a water wet sand more permeable to oil and less permeable to water. Thus, a sand which is completely wet by water and practically impermeable to oil can be treated in place so that the sand then becomes wet by oil and the oil will flow quite readily through the treated sand. In the preferential wetting treatment, only a comparatively small quantity of precipitate is required. This precipitate deposits on the surface of the sand grains, and is believed to change their physical characteristics, particularly wetting power, so that they become preferentially wet by oil rather than by water, assuming equal heads of water and oil.

In another embodiment of the invention, sufficient precipitate may be deposited within the sand to partially block or cement the sand against the passage of water therethrough. If a chemical precipitate having a preferential wetting action of the character of that described above is employed, this will serve to effectively retard or reduce the proportion of water produced, while at the same time render the treated sand more permeable to oil such that even a larger flow or a higher proportion of oil is produced through the partially blocked sand.

The process of the present invention may be conveniently carried out by first forcing into the well and into the sand adjacent the well a solution of a precipitatable chemical compound, preferably of the preferential wetting character described above. Then a solution of a compound which is active to react with the first mentioned compound to produce the desired precipitate is forced into the well and into the sand adjacent the bore of the well, so that these solutions come in reactive contact with each other when disseminated through the sand adjacent the well, with the result that the precipitate so produced is effectively distributed and deposited throughout the treated sand zone. The procedure described above may be repeated one or more times, so as to secure an effective deposit throughout the water wet sand. Preferably, this is then followed by forcing a charge of oil into the well in order to force the chemicals farther out into the sand to increase the zone of treatment, and to immediately create a zone of sand around the well which is wet by oil.

Suitable materials which possess the preferential wetting property include various water and oil insoluble salts of sulphonated fats or fatty acids. For example, the heavy metal salts, including those of calcium, barium, iron, manganese, zinc, tin, lead and the like of sulphonated fats or fatty acids may be employed. Natural fats such as tallow, olein, stearin and the like, which have been sulphonated by treatment with sulphuric acid, are suitable. Likewise, sulphonated fatty acids formed by sulphonating stearic, palmitic, oleic, and the like, are included. A very satisfactory and comparatively cheap material, which is a by-product of the petroleum industry, is the sulphonic sludge acid derived from the treating of petroleum oil with sulphuric acid. These various materials may be conveniently employed in the form of their water soluble alkali metal salts, whereby a solution of the soluble salt may be first forced into the bore of the well and into the sand immediately surrounding the well. Then, a solution of a water soluble calcium, barium or other heavy metal salt, such as a chloride, nitrate or other soluble salt of the heavy metals, is forced into the well and into the sand to react with the first mentioned solution to produce a precipitate of the heavy metal salt of the sulphonated fat or fatty acid. For purposes of description, the salts of calcium, barium, and other alkaline earth metals, are included under the expression "heavy metal salt," along with the salts of such metals as iron, manganese and the like which are more generally understood as heavy metals. For economical reasons, calcium chloride is preferred for this purpose, inasmuch as it constitutes a cheap and readily available material which is frequently produced as a by-product in connection with oil and salt production.

As a specific example of the present invention, the following is mentioned. A dilute water solution of the sodium salt of the sulphonic sludge acids produced in the treatment of petroleum oil with sulphuric acid, is first forced through the sand; and this is followed by a wash with a dilute solution of calcium chloride. The result of these two washes is that the calcium sulphonic sludge salt is precipitated on the sand grains. Another charge of the sodium salt is then forced into the well, followed by another charge of the calcium chloride solution. This may be repeated still a third time, or even more, depending upon the extent of sand to be treated and the quantity of precipitate desired. Finally, a quantity of oil is pumped into the well which will force the chemicals farther out into the sand, and will render the sand in the immediate vicinity of the well wet by oil.

This treatment results in the sand around the well being more readily wet by oil than by water. It does not constitute a complete block or cementing of the sand against the passage of water, but rather renders it easier for the oil to come through the sand while the flow of water is retarded. Oil which is present in the sands near the well will then have a freer passage to the well bore than it had before treatment. In addition, this treatment will produce in effect an enlarged screen, composed of sand wet or preferentially wettable by oil, which the oil can enter on its way to the surface.

We are aware that it has heretofore been the practice to flood an oil sand by the introduction of water and/or chemicals in one well, so that the water and/or chemicals will flood from this input well toward other producing wells, whereby oil is driven to the latter, although the input well is thereby flooded and rendered inactive. The present invention is distinguished from this practice in that the producing well itself is treated by a controlled deposit of a water and oil insoluble precipitate within the sand immediately adjacent this producing well. Furthermore, the precipitate is of such character as to render the sand preferentially wettable by oil, instead of flooding out any oil which may be present therein.

In accordance with the present invention highly permeable water wet sands can be partially plugged or cemented by forcing in relatively high concentrations of chemicals, or large amounts of dilute solutions of chemicals. The heavy metal salts thus precipitated will then hinder passage of fluids back through the highly permeable zones and will thus result in partially blocking or cementing them. A material which acts as a preferential wetting agent is particularly suitable for this purpose, because it results in decreasing the water percentage while at the same time rendering the sand more permeable to oil so that the oil production may be even increased, notwithstanding the partial block.

Obviously many modifications and variations of the invention, as hereinbefore set forth, may be made without departing from the spirit and scope thereof, and therefore only such limitations should be imposed as are indicated in the appended claims.

We claim:

1. The method of treating an oil well, which comprises depositing in the sand adjacent the well a chemical precipitate which acts as a preferential wetting agent to render the sand more permeable to oil and less permeable to water.

2. The method of treating an oil well to increase the proportion of oil and decrease the proportion of water produced therefrom, which comprises depositing in a permeable water wet sand adjacent the well a chemical precipitate in such quantity as to partially block the permeable sand to the passage of water, without substantially retarding the flow of oil to the well.

3. The method of treating an oil well, which comprises forcing into the well and into a water wet sand adjacent the well a solution of a chemical compound which is precipitatable by metal salts, and then forcing into the well and sand adjacent the well a solution of a metal salt to react with the said compound to cause precipitation of a reaction product within the sand to render the latter less permeable to water without substantially retarding the flow of oil to the well.

4. The method of treating an oil well, which comprises depositing in the sand adjacent the well a precipitate of a water and oil insoluble salt of a sulphonated compound selected from the group consisting of fats and fatty acids.

5. The method of treating an oil well, which comprises depositing in the sand adjacent the well a precipitate of a sulphonated sludge derived from the treating of petroleum oil with sulphuric acid.

6. The method of treating an oil well, which comprises depositing in the sand adjacent the well a precipitate of a heavy metal salt of a sulphonic acid derived from the treating of petroleum oil with sulphuric acid.

7. The method of treating an oil well, which comprises depositing in the sand adjacent the well a precipitate of a calcium sludge sulphonate derived by precipitating with a calcium salt a sulphonic ludge acid resulting from the treatment of petroleum oil with sulphuric acid.

8. The method of treating an oil well to improve the production of oil from the well, which comprises forcing into the well and into the sand adjacent the well a solution of a precipitatable compound which is preferentially wettable by oil, then forcing into the well and into the said sand a solution to effect precipitation of the said compound in the sand in an amount to not more than partially block or cement the said sand, and finally forcing into the well a charge of petroleum oil to force the solutions farther out into the sand to increase the zone of treatment and to produce a zone of at least partially permeable sand around the well which is wet by oil.

9. The method of treating an oil well to improve the production of oil from the well, which comprises forcing into the well and into the sand adjacent the well a solution of a precipitatable compound which is preferentially wettable by oil, then forcing into the well and into the said sand a solution to effect precipitation of the said compound in the sand to render the sand preferentially wettable by oil, repeating the above steps in the order named, the amount of said compound so precipitated being insufficient to block or cement the sand, and finally forcing into the well a charge of petroleum oil to force the solutions farther out into the sand to increase the zone of treatment and to create a zone of at least partially permeable sand around the well which is wet by oil.

10. The method of treating an oil well, which comprises forcing into the well a solution of a compound selected from the group consisting of sulphonated fats and fatty acids and soluble salts thereof, followed by forcing into the well a solution of a metal salt of a character to effect precipitation of the metal salt of the said compound within the sand adjacent the well.

11. The method of treating an oil well, which comprises forcing into the well and into the sand adjacent the well a water solution of a soluble compound of a sulphonated sludge derived from the treating of petroleum oil with sulphuric acid, followed by forcing into the well and into the sand adjacent the well a solution of a metal salt of a character to effect precipitation of the metal salt of the sulphonated sludge within the sand adjacent the well.

12. The method of treating an oil well, which comprises forcing into the well and into the sand adjacent the well a water solution of an alkali metal salt of a sulphonic sludge acid derived from the treating of petroleum oil with sulphuric acid, followed by forcing into the well and into the sand adjacent the well a solution of a heavy metal salt active to effect precipitation of the heavy metal salt of the sulphonic sludge acid within the sand adjacent the well.

13. The method of treating an oil well, which comprises forcing into the well and into the sand adjacent the well a water solution of a sodium salt of a sulphonic sludge acid derived from the treating of petroleum oil with sulphuric acid, followed by forcing into the well and into the sand adjacent the well a water solution of a soluble calcium salt active to effect precipitation of the calcium salt of the sulphonic sludge acid within the sand adjacent the well.

14. The method of treating an oil well, which comprises forcing into the well a solution of a compound selected from the group consisting of sulphonated fats and fatty acids and soluble salts thereof, followed by forcing into the well a solution of a metal salt of a character to effect precipitation of the metal salt of the said compound within the sand adjacent the well, and finally forcing into the well a charge of petroleum oil to force the chemicals farther out into the sand to increase the zone of treatment and to create a zone of sand around the well which is wet by oil.

15. The method of treating an oil well, which comprises forcing into the well a water solution of an alkali metal salt of a sulphonic sludge acid derived from the treating of petroleum oil with sulphuric acid, followed by forcing into the well a solution of a heavy metal salt of a character to effect precipitation of the heavy metal salt of the said sulphonic sludge acid within the sand adjacent the well, and finally forcing into the well a charge of petroleum oil to force the chemicals farther out into the sand to increase the zone of treatment and to create a zone of sand around the well which is wet by oil.

16. The method of treating an oil well, which comprises forcing into the well and into the sand adjacent the well a water solution of a sodium salt of a sulphonic sludge acid derived from the treating of petroleum oil with sulphuric acid, followed by forcing into the well and into the sand adjacent the well a water solution of a soluble calcium salt active to effect precipitation of the calcium salt of the sulphonic sludge acid within the sand adjacent the well, and finally forcing into the well a charge of petroleum oil to force the chemicals farther out into the sand to increase the zone of treatment and to create a zone of sand around the well which is wet by oil.

17. The method of treating an oil well which has a highly permeable water wet sand adjacent the well in order to increase the proportion of oil and decrease the proportion of water produced therefrom, which comprises depositing in the said water wet sand a sufficient quantity of a chemical precipitate to partially block or cement the said water wet sand, the said precipitate being of a character to act as a preferential wetting agent to render the resultant partially blocked sand more permeable to oil and less permeable to water.

WILLIAM V. VIETTI.
ALLEN D. GARRISON.